C. GRANEL.
PROCESS FOR THE PRODUCTION OF RESINOUS MATERIALS.
APPLICATION FILED APR. 11, 1913.
1,190,889.
Patented July 11, 1916.
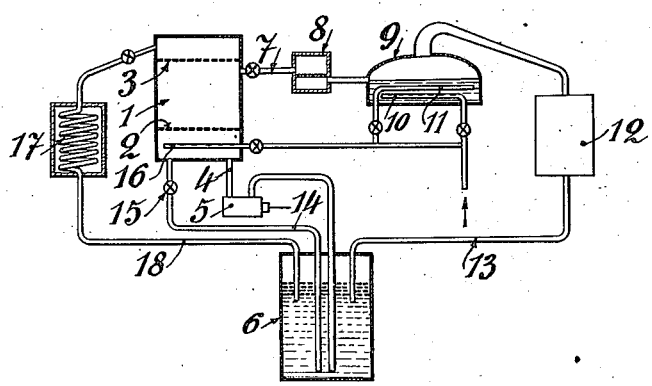
WITNESSES
INVENTOR
Camille Granel
BY
ATTORNEYS

UNITED STATES PATENT OFFICE.

CAMILLE GRANEL, OF BOUSCAT PAR LESPERON, LANDES, FRANCE.

PROCESS FOR THE PRODUCTION OF RESINOUS MATERIALS.

1,190,889.  Specification of Letters Patent.  Patented July 11, 1916.

Application filed April 11, 1913. Serial No. 760,442.

*To all whom it may concern:*

Be it known that I, CAMILLE GRANEL, a citizen of the Republic of France, residing at Bouscat par Lesperon, Landes, in the Republic of France, manufacturer, have invented certain new and useful Improvements in the Processes for the Production of Resinous Materials, of which the following is a specification.

This invention has for its object a process for the extraction of resinous materials contained in the residues of the distillation or purification of pine tappings or turpentine. According to this process, such resinous materials are extracted by means of a suitable solvent such, for instance, as bisulfid of carbon, tetrachlorid of carbon, alcohols, benzols, petroleums, essential oils, and the like, by operating in a manner similar to the usual one for the extraction of grain or cake oils by the use of bisulfid of carbon, either continuously or discontinuously. By means of the application of such novel process of extraction to the treatment of the waste or resinous residues, there can be recovered the greater part of the resinous materials contained in the residues of the distillation of pine-tappings; on treating the residues direct from the purification of these tappings there is obtained a much greater output of the dry materials contained in the said residues with the production of pitch of a brighter color.

One method of application of such process will now be described, by way of example, with reference to the accompanying diagrammatic drawings.

The resinous residues are placed in an extractor 1 between two perforated plates 2 and 3 covered with filtering tissue or fabric. The extractor being hermetically closed, there is forced through a conduit 4, by means of a pump 5, the solvent, either bisulfid of carbon or other solvent, from a closed vat 6. Such solvent rises through the mass to be treated, dissolves the resinous materials and then passes through a conduit 7, to a filter 8, to separate from the charged solvents any particles of the residues carried along with it, and from the filter the charged solvent is delivered to a still boiler 9 heated by a perforated vessel or stirrer 10 and a serpentine steam pipe 11. The solvent which is distilled passes for condensation purposes to a cooling vessel 12, whence it returns to the vat 6 through a conduit 13. Toward the close of the distillation, the last traces of the solvent are expelled by raising the temperature progressively to 100° centigrade, and lastly a jet of steam of a temperature of about 150° centigrade is sent in direct, so as to expel entirely the solvent and the water condensed in the mass, in order to obtain a transparent product. What remains of the solvent in the extractor is then brought back into the vat 6 through the conduit 14, provided with a cock 15. When dripping is over, steam is sent into the serpentine bubbler pipe 16 located underneath the plate 2. Such steam passes through the exhausted residues and vaporizes the solvent with which they may still be impregnated; the mixture of vapors is condensed in the serpentine pipe 17, whence a conduit 18 brings the mixture of water and solvent back to the vat 6. The water lies at the top of the solvent and prevents the evaporation of the latter. Lastly, the exhausted residues are withdrawn from the extractor.

From time to time, the solvent must be rectified, as it takes in little by little an essential oil from the distillation of the resinous solution. For that purpose, the rectifying liquid is sent into the distillation chamber 9 and heated therein to a temperature comprised between the boiling point of the solvent and that of the essential oil. The oil thus separated can then be freed of the traces of solvent which it still contains by a treatment with chlorid of lime or any other suitable treatment. Of course, this method of operation given by way of example can be modified without departing from the invention. In particular, the process may be the same as that used, for instance, in the manufacture of oils for the continuous extraction by means of bisulfid of carbon.

With solvents such as alcohols, benzols, petroleums, essential oils, and the like the operations may be the same as with bisulfid or tetrachlorid of carbon. It is to be observed, however, that if use is made of solvents lighter than water or the resin, this must be taken into account as to the separation of the water from the solvent, and the exhaustion of the resins from the residues may be done in sending the solvent in at the top of the extractor.

If use is made of alcohols, they must be rectified after each operation by well known means.

It must be observed that resinous waste comprises several resins unequally soluble in different solvents and that advantage may be taken of such differences of solubility to obtain the division into fractions of the resins which are present. In particular, the residues include yellow resins called colophony, soluble in certain well known solvents, and red or brown resins, insoluble in petroleums, for instance. If therefore it is desired, to extract only resins having but little color, all that need be done is to choose the solvent in the petroleum and hydrocarbon series with but little benzin and to make the dissolution at a temperature below the melting point of the coloring materials. For such purpose, use may be made of a vacuum with advantage.

Claims:

1. A process for the extraction of the resinous materials contained in the waste from the distillation of the tappings, consisting in forcing through the mass of tapping waste a solvent from a closed reservoir, such solvent being so selected as to dissolve the clear resins while not acting on the darker resins, in operating at a temperature below the melting point on the darker resins, in distilling the resinous solution thus obtained, in condensing the vapors given off, and in returning the condensed liquor to the said closed reservoir.

2. The herein described process of extracting resinous matter contained in the residues from the distillation of pine tappings, which consists in treating said residues with a volatile solvent in a hermetically sealed vessel, separating the solution thus obtained from the tappings, heating the solution to a temperature below the vaporizing point of the resinous matter and above the vaporizing point of the solvent, condensing the solvent, increasing the temperature of the heated resinous matter progressively to 100° C., and subsequently treating the resinous matter to a jet of steam of substantially 150° C. for expelling the remainder of the solvent.

3. A process of extracting from the resinous substances contained in the waste from distillation of the pine tappings, consisting in forcing under pressure carbon bisulfid through the waste mass starting from a closed tub, said mass being placed in an extractor, then in gathering said carbon bisulfid charged with resin dissolved in a distilling boiler, in distilling said resin carbon bisulfid in said boiler, in conducting the carbon bisulfid through a refrigerant, then in said closed tub alone, in causing the passage of steam at a temperature of about 150° C. through the resin mass in the boiler, in bringing back to said closed tub the greater part of the remainder of carbon bisulfid charged with resin in said extractor; in sending through the latter steam in order to remove the balance of the carbon bisulfid, in condensing said steam and the carbon bisulfid, and in bringing the products of said condensation into the said closed receptacle, substantially as described.

In testimony, that I claim the foregoing as my invention I have signed my name in presence of two subscribing witnesses.

CAMILLE GRANEL.

Witnesses:
GILE CRISPEL,
HENRY PHILLIPS.